US010666377B2

(12) United States Patent
Yu et al.

(10) Patent No.: US 10,666,377 B2
(45) Date of Patent: May 26, 2020

(54) METHOD AND APPARATUS FOR MATCHING FIBER CONNECTIONS FOR ROADM SERVICE

(71) Applicant: ACCELINK TECHNOLOGIES CO., LTD., Hubei, Wuhan (CN)

(72) Inventors: Jiekui Yu, Hubei (CN); Ying Zhang, Hubei (CN); Zhaoxia Liu, Hubei (CN); Jian Xu, Hubei (CN)

(73) Assignee: Accelink Technologies Co., Ltd., Wuhan (CN)

( * ) Notice: Subject to any disclaimer, the term of this patent is extended or adjusted under 35 U.S.C. 154(b) by 0 days.

(21) Appl. No.: 16/226,591

(22) Filed: Dec. 19, 2018

(65) Prior Publication Data

US 2020/0092027 A1    Mar. 19, 2020

(51) Int. Cl.
*H04J 14/02* (2006.01)
*H04B 10/07* (2013.01)
*H04Q 11/00* (2006.01)

(52) U.S. Cl.
CPC ...... *H04J 14/0264* (2013.01); *H04J 14/0205* (2013.01); *H04J 14/0212* (2013.01);
(Continued)

(58) Field of Classification Search
None
See application file for complete search history.

(56) References Cited

U.S. PATENT DOCUMENTS 6,005,696 A * 12/1999 Joline .................... H04B 10/07
370/241
8,995,832 B2 * 3/2015 Ji .......................... H04J 14/0212
398/43

(Continued)

OTHER PUBLICATIONS

Durkin et al., Building Multiservice Transport Networks, 2006, ciscopress.com (Year: 2006).*

*Primary Examiner* — Jai M Lee
(74) *Attorney, Agent, or Firm* — Vierra Magen Marcus LLP

(57) ABSTRACT

The present disclosure relates to a technical field of optical communication, and more particularly to a device and method for matching optical fiber connections for ROADM service side, wherein the device comprises a reference control optical channel transmitter, a downlink WSS, a plurality of emitting ports, a reference control optical channel receiver, an uplink WSS and a plurality of receiving ports; the reference control optical channel transmitter emitting a reference control optical channel signal, and the downlink WSS emitting the reference control optical channel through the respective emitting ports in a polling manner; the reference control optical channel receiver receiving the reference control optical channel signal, and the uplink WSS selectively receiving the reference control optical channel over the plurality of receiving ports in the polling manner; wherein the reference control optical channel operating within an operating wavelength range of WSSs in the ROADM but outside a wavelength range of a service optical channel. By using WSS to control polling of the reference control optical channel among service side ports of ROADM, the present disclosure realizes an auto-routing matching of an optical fiber connection between different service side ports of ROADM and improves configuration efficiency, and at the same time, also realize to monitor performance of the optical fiber connection between service side ports of ROADMs in different directions and be a standby physical channel for chassis cascade.

9 Claims, 8 Drawing Sheets

(52) U.S. Cl.
CPC .......... *H04J 14/0217* (2013.01); *H04B 10/07* (2013.01); *H04Q 2011/0083* (2013.01)

(56) References Cited

U.S. PATENT DOCUMENTS

| | | | | |
|---|---|---|---|---|
| 9,660,755 | B2* | 5/2017 | Hurley | H04J 14/021 |
| 10,009,671 | B2* | 6/2018 | Younce | H04B 10/0773 |
| 10,389,469 | B2* | 8/2019 | Yilmaz | H04B 10/506 |
| 10,397,063 | B2* | 8/2019 | Ceccarelli | H04L 41/0677 |
| 2002/0015199 | A1* | 2/2002 | Eder | H04B 10/0775 398/36 |
| 2002/0196493 | A1* | 12/2002 | Marom | H04J 14/0209 398/82 |
| 2007/0019642 | A1* | 1/2007 | Lu | H04L 12/467 370/389 |
| 2007/0086332 | A1* | 4/2007 | Way | H04J 3/14 370/223 |
| 2007/0115456 | A1* | 5/2007 | Wisseman | H04B 10/00 356/73.1 |
| 2010/0221004 | A1* | 9/2010 | Haslam | H04J 14/0201 398/49 |
| 2010/0266275 | A1* | 10/2010 | Xia | H04B 10/0773 398/16 |
| 2011/0200324 | A1* | 8/2011 | Boertjes | H04J 14/0212 398/16 |
| 2013/0195462 | A1* | 8/2013 | Ghioni | H04J 14/0212 398/83 |
| 2013/0315579 | A1* | 11/2013 | Xia | H04Q 11/0001 398/5 |
| 2013/0322868 | A1* | 12/2013 | Wellbrock | H04J 14/0209 398/16 |
| 2014/0241719 | A1* | 8/2014 | Sone | H04J 14/0202 398/48 |
| 2015/0125141 | A1* | 5/2015 | Hu | H04Q 11/0005 398/5 |
| 2016/0099851 | A1* | 4/2016 | Archambault | H04J 14/0217 398/16 |
| 2016/0191188 | A1* | 6/2016 | Butler | H04J 14/0212 398/48 |
| 2016/0315701 | A1* | 10/2016 | Yuki | H04J 14/0221 |
| 2016/0356670 | A1* | 12/2016 | Brillhart | G01M 11/3136 |
| 2016/0365921 | A1* | 12/2016 | Costantini | H04B 10/564 |
| 2017/0104530 | A1* | 4/2017 | Nagata | H04B 10/0775 |
| 2017/0250752 | A1* | 8/2017 | Yuki | H04B 10/07955 |
| 2018/0205485 | A1* | 7/2018 | Yuki | H04B 10/807 |
| 2018/0278361 | A1* | 9/2018 | Nakata | H04B 10/07955 |

* cited by examiner

METHOD AND APPARATUS FOR MATCHING FIBER CONNECTIONS FOR ROADM SERVICE

TECHNICAL FIELD OF THE DISCLOSURE

The present disclosure relates to a technical field of optical communication, and more particularly to a device and method for matching optical fiber connections for ROADM service side.

BACKGROUND

A Reconfigurable Optical Add-Drop Multiplexer (ROADM) is a key technology for automatic scheduling of wavelength-level services in Wavelength Division Multiplexing (WDM) optical networks. Service side ports of an integrated circuit board for ROADMs (also referred to as ROADM card) in different directions inside ROADM nodes are interconnected each other by optical fibers, which physically realizes cross between services in different directions. When the network management layer performs a service scheduling, it is necessary to query the physical connection topology information of the optical fiber on service side ports of ROADMs in different directions to realize a correct scheduling of service routes. For example, interconnections and intercommunications between service sides of the integrated circuit board for ROADMs in four directions inside a 4-dimensional ROADM node needs 6 pairs of optical fiber connections, and interconnections and intercommunications between service sides of the integrated circuit board for ROADMs in eight directions inside a 8-dimensional ROADM node needs 28 pairs of optical fiber connections, further interconnections and intercommunications between the service sides of the integrated circuit board for ROADMs in twenty directions inside a 20-dimensional ROADM node needs 190 pairs of optical fiber connections.

At present, information on actual optical fiber connections among service sides of ROADMs in different directions inside ROADM nodes is usually entered into a database in advance by manual configuration for ROADM to automatically schedule service channels. However, this manner is inefficient, has poor real-time performance, is prone to error, and is difficult to check after an error occurs. In another method, a route matching is realized based on detecting spectrum information output from line sides of ROADM, however, the speed of collecting spectrum information is slow, and the route matching is depending on a service channel being opened in advance and may not be realized before the service channel is opened, further, the configuration of the existing service may not be unaffected; when a network scale is large, wavelengths intersected among different directions may be multiplexed, e.g., there is a wavelength l between direction a and direction b, and there is also a wavelength l between direction c and direction d, so an accurate matching may not be completed only by depending on a service wavelength which does not carry information on a routing direction. There is also a method of using an optical backplane to avoid optical fiber connections on external service sides, however, the reliability is low and the cost is high, and when a ROADM dimension is large, sharing backplane also causes the chassis to be bulky.

On account of this, it is an urgent problem to be solved in the art to overcome above defects existing in the prior art.

SUMMARY

The technical problems to be solved by the present disclosure are as follows:

Currently, when establishing information on optical fiber physical connection at service side ports of ROADMs in different directions, physical optical fiber connection relationship is entered into a database through manual configuration, which is inefficient, has poor real-time performance, is prone to error, and is difficult to check after an error occurs.

The present disclosure achieves the above purpose through following technical solutions:

In a first aspect, the present disclosure provides a device for matching optical fiber connections for ROADM service side comprising: a reference control optical channel transmitter, a downlink Wavelength Selective Switch (WSS), a plurality of emitting ports, a reference control optical channel receiver, an uplink WSS and a plurality of receiving ports;

the reference control optical channel transmitter emitting a reference control optical channel signal, and the downlink WSS emitting the reference control optical channel through the respective emitting ports in a polling manner;

the reference control optical channel receiver receiving the reference control optical channel signal, and the uplink WSS selectively receiving the reference control optical channel over the plurality of receiving ports in the polling manner;

wherein the reference control optical channel operating within an operating wavelength range of WSSs in the ROADM but outside a wavelength range of a service optical channel.

Preferably, a combiner is further comprised and is located between the reference control optical channel transmitter and the downlink WSS, further the combiner operates to multiplex a downlink service signal of the ROADM with the reference control optical channel and inject them into the downlink WSS.

Preferably, a wave separator is further comprised and is located between the uplink WSS and the reference control optical channel receiver, further, the wave separator operates to separate the reference control optical channel from the uplink service optical signal of the ROADM.

In a second aspect, the present disclosure further provides a method for matching optical fiber connections for ROADM service side, which may be realized by the device for matching optical fiber connections for ROADM service side as described in above first aspect, and a reference control optical channel is used in the ROADM service side, the reference control optical channel operating within an operating wavelength range of WSS in the ROADM but outside a wavelength range of a service optical channel; an uplink WSS, a downlink WSS, a plurality of emitting ports and a plurality of receiving ports being provided in the ROADM, and the method comprises:

on an emitting side of the reference control optical channel, emitting, by the downlink WSS, a reference control optical channel signal through the respective emitting ports in a polling manner; on a receiving side of the reference control optical channel, receiving, by the uplink WSS, the reference control optical channel over the respective receiving ports in the polling manner, when any receiving port of the present ROADM receives the reference control optical channel signal from a certain emitting port of another ROADM, establishing a matching relationship between the receiving port of the present ROADM and the certain emitting port of the another ROADM connected by an optical fiber.

Preferably, on the emitting side of the reference control optical channel, the reference control optical channel signal emitted through the respective emitting ports carries ROADM card information and corresponding emitting, port information.

Preferably, on an emitting side of the reference control optical channel, emitting, by the downlink WSS, a reference control optical channel signal through the respective emitting ports in a polling manner, further comprises: determining a current emitting port through polling by the downlink WSS, emitting the reference control optical channel signal which carries the ROADM card information and the current emitting port information from the determined current emitting port by a reference control optical channel transmitter, thereby transmitting the carried information;

wherein when a downlink service optical signal and the reference control optical channel signal exist simultaneously, the downlink service signal is injected into the downlink WSS together with the reference control optical channel signal, and is emitted out from the corresponding emitting port.

Preferably, when any receiving port of the present ROADM receives the reference control optical channel signal from a certain emitting port of another ROADM, establishing a matching relationship between the receiving port of the present ROADM and the certain emitting port of the another ROADM connected by an optical fiber, further comprises:

determining a current receiving port through polling the respective receiving ports by the uplink WSS;

when the reference control optical channel receiver receives, through the current receiving port, the reference control optical channel signal emitted from an emitting port of another ROADM in any other direction, analyzing the carried information of the received reference control optical channel signal; and through analyzing the carried information, determining the ROADM and corresponding emitting port that emits the reference control optical channel signal, establishing a matching relationship between the current receiving port of the present ROADM and the corresponding emitting port of the emitting ROADM connected by an optical fiber, and generating configuration information of the connecting optical fiber for the two ports.

Preferably, the reference control optical channel receiver receiving, through the current receiving port, the reference control optical channel signal emitted from an emitting port of another ROADM in any other direction further comprises: combined optical signal of the uplink service signal of the ROADM and the reference control optical channel signal entering into the uplink WSS through the current receiving port, and after being separated, injecting the reference control optical channel signal into the reference control optical channel receiver.

Preferably, the reference control optical channel signal emitted by the reference control optical channel transmitter through the respective emitting port carries transmitting optical power information, and the method further comprises, after the connection relationship is established between an emitting port x of a X-direction ROADM and a receiving port y of a Y-direction ROADM:

a reference control optical channel receiver of the Y-direction ROADM detecting received optical power, obtaining the transmitting optical power information emitted by a reference control optical channel transmitter of the X-direction ROADM through the emitting port x, and calculating an insertion loss on a corresponding link;

retrieving an insertion loss from the reference control optical channel transmitter of the X-direction ROADM to the emitting port x and an insertion loss from the receiving port y to the reference control optical channel receiver of the Y-direction RADM calibrated and stored in ROADM cards in advance;

calculating, from the above data, an insertion loss of the physical optical fiber connection between the emission port x of the X-direction ROADM and the receiving port y of the Y-direction ROADM.

Preferably, when a duplex connection relationship is established between service side ports of two ROADMs in different directions and the two ROADMs in different directions are located in different chassis, the reference control optical channel further operates as a backup physical channel for a cascade communication channel between different chassis for carrying cascade interactive services between the chassis.

In comparison with the prior art, the beneficial effects of the present disclosure are as follows:

in the device and method for matching optical fiber connections for ROADM service side provided by the present disclosure, inserting a reference control optical channel which operates in the wavelength range that may be supported by WSS but outside a wavelength range of a service optical channel on the service side of ROADM, and using WSS to control polling of the reference control optical channel between service side ports of ROADM, realizes auto-routing matching of physical connection between different service side ports of ROADM, and solves the problem of low efficiency of manually configuring optical fiber connection routing. Meanwhile, after a connection relationship is established among corresponding ports of ROADMs in different directions, performance of optical fiber connection on the service sides of the ROADMs in different directions may also be detected, and when the ROADMs in different directions are located in different chassis, communication of the reference control optical channel may also be used as a backup physical channel for cascade communication channels between different chassis.

BRIEF DESCRIPTION OF THE DRAWINGS

In order to more clearly illustrate the technical solutions of embodiments of the present disclosure, the drawings to be used in the embodiments of the present disclosure will be briefly described below. Obviously, the drawings described below are only some embodiments of the present disclosure, and for those skilled of the art, other drawings may be Obtained according to these drawings without an T inventive works.

DETAILED DESCRIPTION

Figure 1:
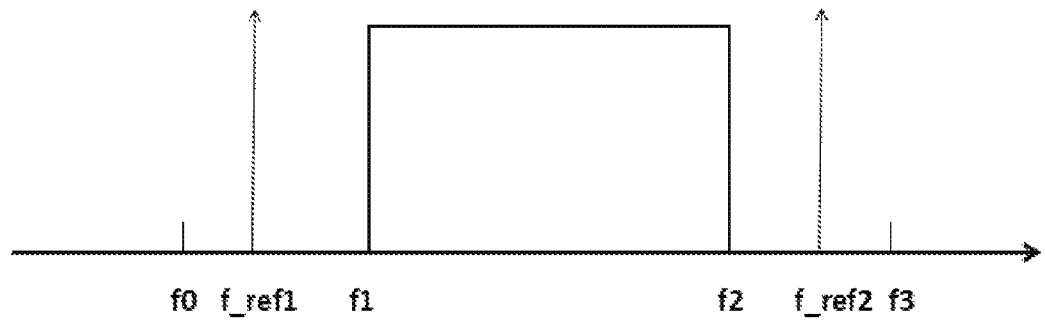
FIG. 1 is a diagram showing frequency relationship between a reference control optical channel and a service optical channel according to an embodiment of the present disclosure.

In order to make the purpose, the technical solution and advantages of the present disclosure clearer, the present disclosure will be described in further detail below with reference to the drawings and embodiments. It should be understood that the specific embodiments described herein are only for the purpose of explaining the present disclosure and are not intended to limit the present disclosure.

In the description of the present disclosure, the orientation or positional relationship indicated by the terms "within"; "outside", "longitudinal", "transverse", "upper", "lower", "top", "bottom" and the like is based on the orientation or positional relationship shown in the drawings, only for convenience of description of the present disclosure rather than requiring the invention to be constructed and operated in a specific orientation, therefore, should not be understood as limitation to the present disclosure.

Further; the technical features involved in various embodiments of the present disclosure described below may be combined with each other as long as they do not constitute a conflict with each other. The present disclosure will be described in detail below with reference to drawings and embodiments.

Embodiment 1

The embodiment of the present disclosure provides a device for matching optical fiber connections for ROADM service side. For a ROADM in a single direction, a reference control optical channel is inserted at a service side of ROADM, and the reference control optical channel works in a working wavelength range of a Wavelength Selector Switch (abbreviated as WSS) in the ROADM but outside a wavelength range of a service optical channel. In this way, the reference control optical channel does not occupy a wavelength of the service optical channel and may communicate independently, therefore, it is not limited by the presence or absence of a service optical signal and could not affect an existing service optical signal in a network. As shown in FIG. 1, frequency occupied by the service optical channel of the ROADM is between f1 to f2, mainly depending on a working wavelength of an optical amplifier; and the working frequency of WSS in the ROADM is between f0 to f3, including f1 to f2, then a reference control optical channel may be inserted between f0 to f1 or between f2 and f3. Since the WSS may independently configure routing of any, wavelength, a signal of service optical channel is not affected by the insertion of reference control optical channel(s).

Wherein the selection principle of the reference control optical channel is specifically as follows: in generally, C-band communication occupies 40 nm service optical bandwidth; in combination with FIG. 1, assuming that f1 and f2 corresponding to the frequency interval occupied by the service optical channel are 191.325 THz and 196.125 THz, respectively, while the WSS may support a wider frequency range, for example, f0 and f3 are 191.125 THz and 196.275 THz, respectively, then 0.2 T between f0 and f1 and 0.15 T between f2 and f3 may be occupied by the reference control optical channel. Wherein the frequency range of service optical channel and the frequency range of WSS described here are only for convenience of explanation, and the specific frequency range may be different from the above examples, and details are not described herein again.

Figure 2:
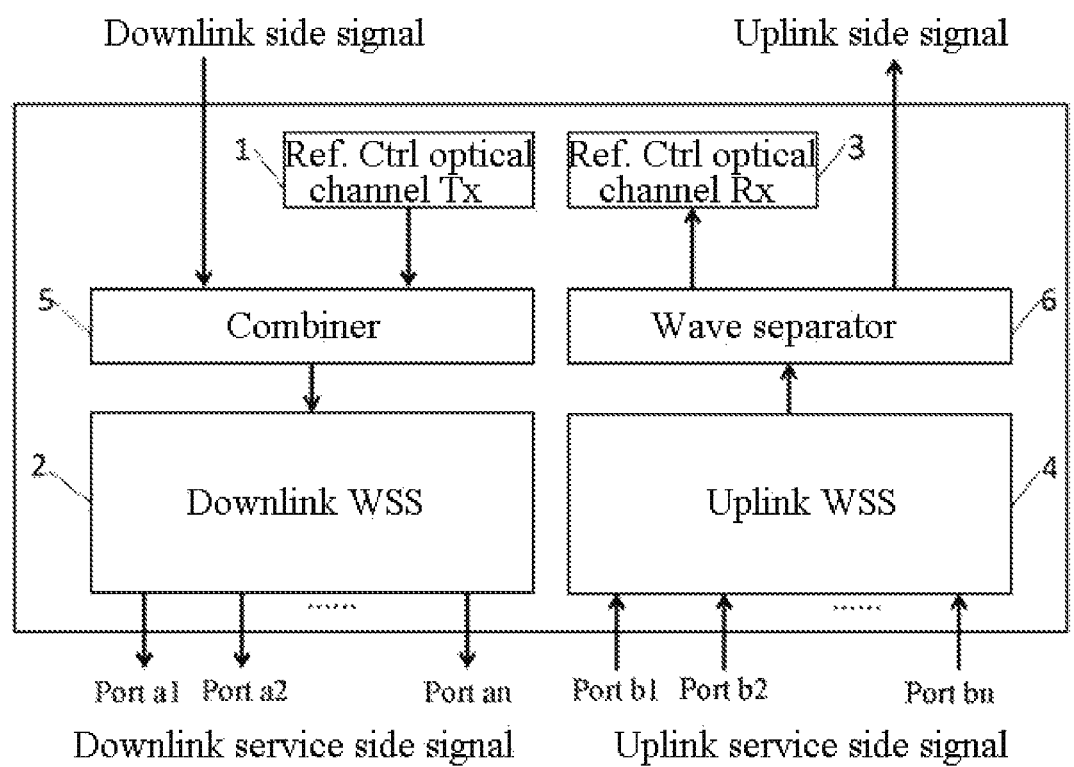
FIG. 2 is a schematic structural diagram of a ROADM in a single direction comprising a reference control optical channel according to an embodiment of the present disclosure.

Referring to FIG. 2, the device comprises a reference control optical channel transmitter 1, a downlink WSS 2, a plurality of emitting ports at a downlink service side, a reference control optical channel receiver 3, an uplink WSS 4 and a plurality of receiving ports at an uplink service side. Assuming that there are n emitting ports and n receiving ports, the n emitting ports are recorded as port a1 to port an and the n receiving ports are recorded as port b1 to port bn, respectively.

In a specific embodiment, referring to FIG. 2, the downlink WSS 2 and the uplink WSS 4 both use 1×n WSS, and the device further comprises combiner 5 and wave separator 6. The reference control optical channel transmitter 1, the combiner 5, the downlink WSS2 and a plurality of emitting ports are all located on a path of downlink side signal, and the combiner 5 is located between the reference control optical channel transmitter 1 and the downlink WSS 2. The reference control optical channel transmitter 1 is used to emit a reference control optical channel signal. When a downlink service optical signal is generated simultaneously with the reference control optical channel signal, the combiner 5 is used to combine the downlink service signal with the reference control optical channel and then inject them into the downlink WSS 2. While the downlink WSS 2 routes the downlink service signal, emission of the reference control optical channel at the respective emitting ports in a polling manner may be realized.

Continuously referring to FIG. 2, the reference control optical channel receiver 3, the uplink WSS 4, the wave separator 6, and a plurality of receiving ports are all located on the path of the uplink side signal, and the wave separator 6 is located between the uplink WSS 4 and the reference control optical channel receiver 3. The reference control optical channel receiver 3 is used to receive a reference control optical channel signal, and the uplink WSS 4 may be used to select the reference control optical channel at the respective receiving ports in a polling manner while routing the uplink service signal, and the wave separator 6 is used to separate the reference control optical signal from the uplink service optical signal of ROADM, and then inject the reference control optical signal into the reference control optical channel receiver 3. When an optical fiber physical connection between a certain emitting port of ROADMs in different directions and a certain receiving port of the present ROADM normally exists, communication of the reference control optical channel could be established between the two corresponding ports. The specific method will be introduced in Embodiment 2, and details are not described herein again.

Figure 3:
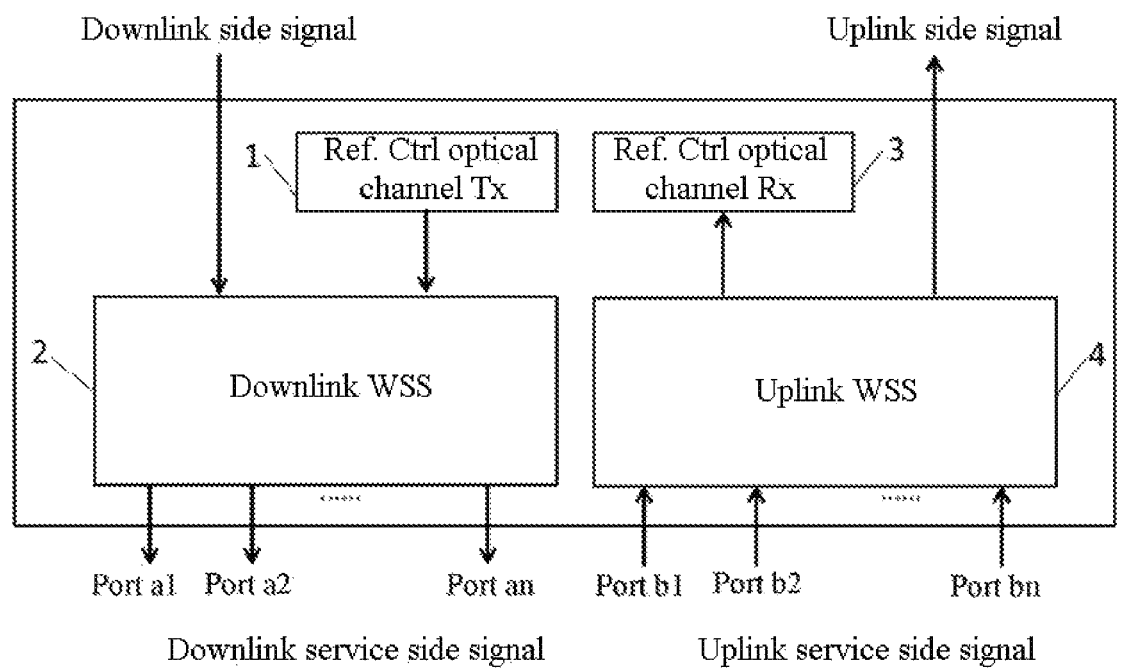
FIG. 3 is a schematic structural diagram of another ROADM in a single direction comprising a reference control optical channel according to an embodiment of the present disclosure.

In another specific embodiment, referring to FIG. 3, the downlink WSS 2 uses 2×n WSS, then there is no need to provide a combiner between the reference control optical channel transmitter 1 and the downlink WSS 2, and combination of the downlink service signal and the reference control optical channel is directly completed by 2×n WSS. And/or, the uplink WSS 4 uses 2×n WSS, then there is no need to provide a wave separator between the reference control optical channel receiver 3 and the uplink WSS 4, and waves of the downlink service signal and the reference control optical channel are directly completed separating by 2×n WSS. FIG. 3 shows a case in which both the downlink WSS 2 and the uplink WSS 4 use 2×n WSS, which further simplifies the structure.

Figure 4:
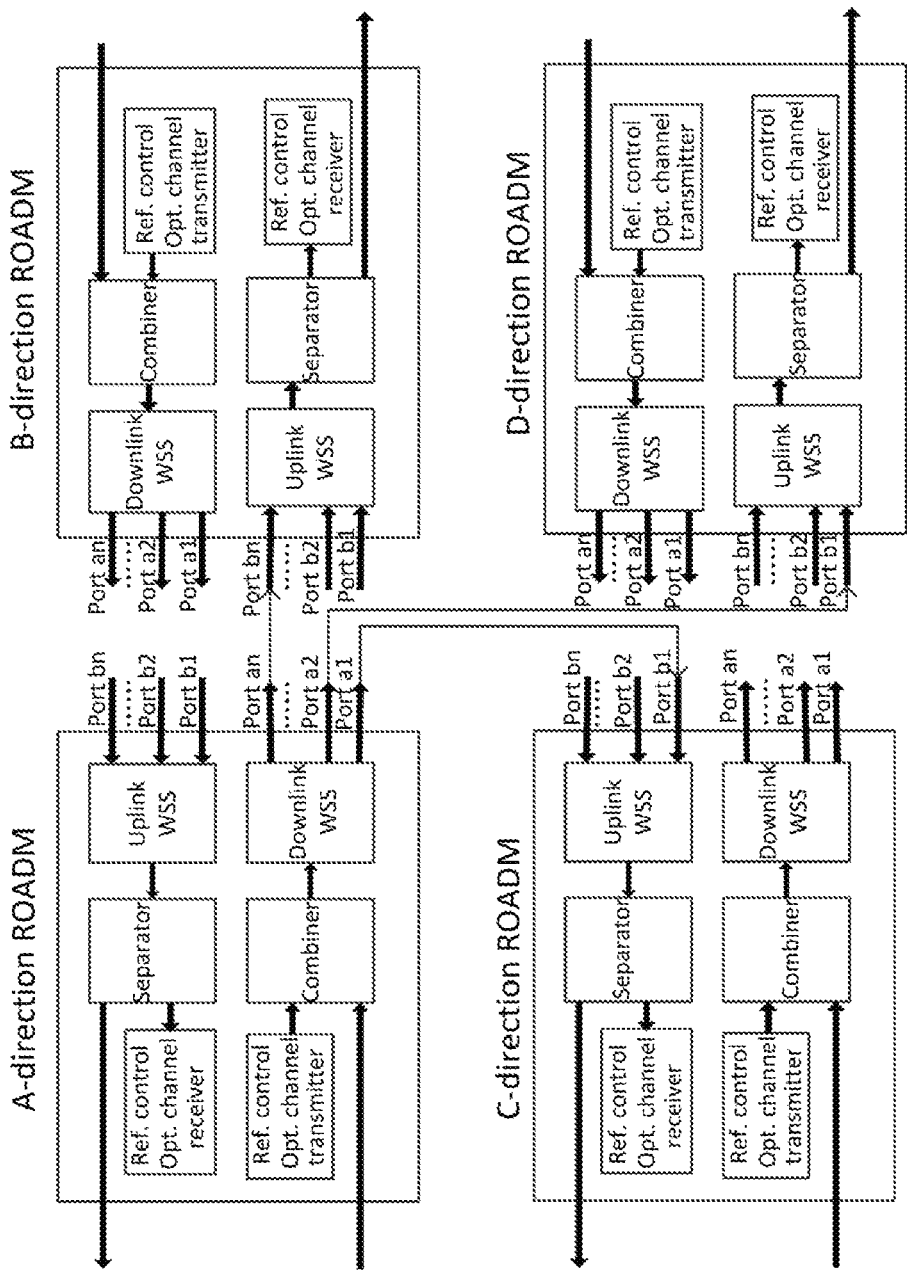
FIG. 4 is a schematic diagram of a portion of optical fiber connection of a service side of integrated circuit board for ROADMs in four different directions having reference control optical channels according to an embodiment of the present disclosure.

Taking the structure of ROADM in a single direction shown in FIG. 2 as an example, it is assumed that there are ROADMs in four directions in the current network: a ROADM in direction A (also referred to as A-direction ROADM), a ROADM in direction B (also referred to as B-direction ROADM), a ROADM in direction C (also referred to as C-direction ROADM), and a ROADM in direction D (also referred to as D-direction ROADM), and each direction ROADM unit is shown in FIG. 2, then optical fiber connection relationships between service side ports of ROADMs in different directions are shown in FIG. 4, wherein port a1 on an emitting side of the ROADM in direction A is connected to port b1 on a receiving side of the ROADM in direction C through an optical fiber; port a2 on an emitting side of the ROADM in direction A is connected to port b1 on a receiving side of the ROAM in direction D through an optical fiber; port an on an emitting side of the ROADM in direction A is connected to port bn on receiving side of the ROADM in direction D through an optical fiber. The method for matching between the ports will be specifically described in Embodiment 2, and details are not described herein again.

In the device for matching optical fiber connections for ROADM service side provided by the present disclosure, a reference control optical channel transmitter and a reference control optical channel receiver are provided, in this way, the matching device uses a reference control optical channel working in the wavelength range that may be supported by the WSS but outside the wavelength range of a service optical channel, realizes auto-routing matching of optical fiber connection between service side ports of different ROADMs without interference to service light through the WSS, and solves the problem of low efficiency of manually configuring optical fiber connection routing.

Embodiment 2

On the basis of above embodiment 1, the embodiment of the present disclosure further provides a method for matching optical fiber connections for ROADM service side, which may be realized through the device described in Embodiment 1. A reference control optical channel is inserted on a service side of ROADM, and the reference control optical channel works in the working wavelength range of WSS in the ROADM but outside the wavelength range of a service optical channel. For specific settings, it may refer to embodiment 1 and FIG. 1, then the method comprises:

For a ROADM in a single direction, in combination with a downlink service link of a ROADM in left half portion of FIG. 2, on an emitting side of a reference control optical channel, emitting a reference control optical channel signal among the respective emitting ports through the downlink WSS 2 in a polling manner; wherein the reference control optical channel signal emitted through each emitting port carries information on integrated circuit board for ROADM and information on corresponding emitting port. In combination with an uplink service link of the ROADM in right half portion of FIG. 2, at a receiving side of the reference control optical channel, the reference control optical channel signal is selected and received through polling by the uplink WSS 4 at each receiving port. When the reference control optical channel receiver 3 receives a reference control optical channel signal from other ROADM through any of receiving ports, the carried information of the reference control optical channel signal is analyzed, through these carried information, a matching relationship of optical fiber connection between a corresponding receiving port of the present ROADM and a corresponding emitting port of other ROADM is established, and the configuration information of optical fiber connection between the two ports is generated.

In the method for matching optical fiber connections for ROADM service side provided by the present disclosure, the reference control optical channel is inserted on the service side of ROADM, and the reference control optical channel does not occupy a wavelength of a service optical channel and may communicate independently; the WSS in the ROADM is used to control polling of the reference control optical channel among different service side ports of ROADM, when an optical fiber connection between ports of ROADMs in different directions is normal, the matching of ports may be realized, thus information is provided for the correct configuration of service route. This method improves the efficiency and accuracy of matching query and has good real-time performance.

Taking the structural diagram of ROADM with a reference control optical channel shown in FIG. 2 as an example, for a ROADM in a single direction, in downlink service, the polling emission and control process for a reference control optical channel signal is as follows: determining a current emitting port through polling by the downlink WSS 2, emitting a reference control optical channel signal which carries information on integrated circuit board for ROADM and information on current emitting port by the reference control optical channel transmitter and outputting from a corresponding emitting port, and then transmitting the carried information. Wherein, for n emitting ports, the downlink WSS 2 polls sequentially, for example, in an ascending order of port a1, port a2, . . . , port an, or in other specified order which is not limited here. It is assumed that port a1 is currently polled, i.e. the ROADM in this direction selects to emit a reference control optical channel signal from its port a1; then, the reference control optical channel transmitter 1 emits the reference control optical channel signal carrying corresponding information. For example, if a current ROADM is the ROADM in direction A, the reference control optical channel signal carries information on the ROADM in direction A and information on the corresponding port a1. The reference control optical channel signal is emitted by the reference control optical channel transmitter 1, injected into the downlink WSS 2, output from the currently selected port a1 and transmitted outward through port a1. Therefore, the reference control optical channel may transmit information it each emitting port through polling by the downlink WSS.

In practical applications, a service signal does not necessarily occur simultaneously with a reference control optical channel signal, generally, configuration information of physical optical fiber connections is established through the reference control optical channel, and then the service signal is turned on. Referring to the device diagram of FIG. 2, in downlink service, downlink service signals after generated, are sequentially injected into the combiner 5 and the downlink WSS 2, and then is output from a corresponding emitting port. Wherein when the downlink service optical signal and the reference control optical channel signal exist simultaneously the downlink service signal and the reference control optical channel are firstly combined by the combiner 5, and the formed combined light is injected into the downlink WSS 2 and is output from the corresponding emitting port. The downlink WSS 2 may independently and flexibly switch the reference control optical channel to any of emitting ports, which is not limited whether the service optical signal exists and could not affect the existing service optical signal in a network since the reference control optical channel does not occupy wavelength of a service optical channel.

Figure 5:
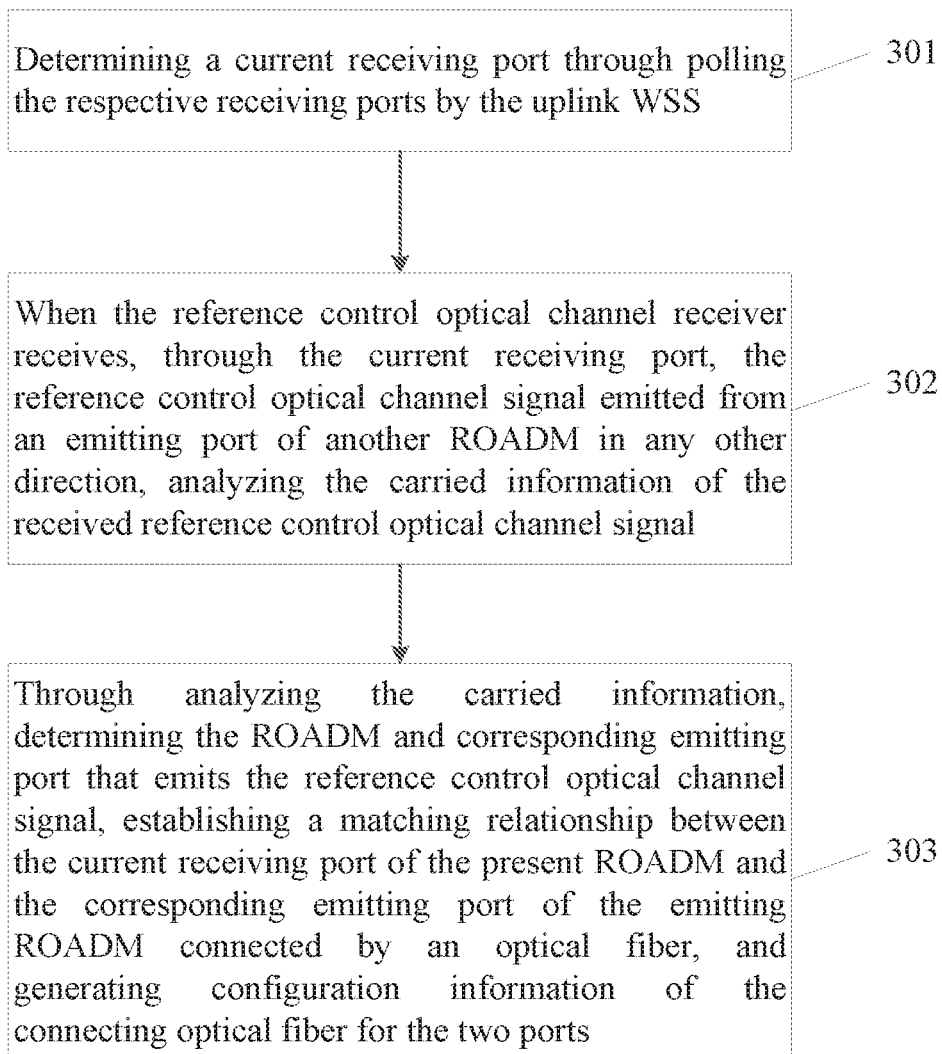
FIG. 5 is a flowchart of a ROADM uplink service after a reference control optical channel being inserted according to an embodiment of the present disclosure.

Continuously taking the structural diagram of the ROADM with a reference control optical channel shown in FIG. 2 as an example, for a ROADM in a single direction, in uplink service, the special process of selecting to receive the reference control optical channel through polling of the uplink WSS among each receiving port as shown in FIG. 5 comprises following steps:

Step 301: determining a current receiving port through polling for the respective receiving ports by the uplink WSS. Similar to polling for emitting ports, for n receiving ports, the uplink WSS may poll sequentially in ascending order of port b1, port b2, . . . , port bn, or in other specified order which is not limited here. It is assumed that the receiving port currently polled is port b1.

Step 302: when a reference control optical channel receiver receives a reference control optical channel signal output from an emitting port of ROADM in any other direction through the current receiving port, analyzing information carried by the received reference control optical channel signal. Assuming port b1 is currently selected, the reference control optical channel receiver 3 may receive the reference control optical channel signal, it indicates that there is an optical fiber connection between port b1 and a certain emitting port of the ROADM in other certain direction, and then the carried information is analyzed. The process of receiving the reference control optical channel through port b1 further comprises: the combined optical signal of both the uplink service signal of the ROADM and the reference control optical channel signal entering into the uplink WSS 4 through the current receiving port b1; the wave separator 6 separating the uplink service optical signal from the reference control optical channel, and making the reference control optical channel signal inject into the reference control optical channel receiver 3.

Step 303: through analyzing the carried information, determining the ROADM and corresponding emitting port that outputs the reference control optical channel signal, establishing a matching relationship between the current receiving port of the present ROADM and a corresponding emitting port of emitting ROADM connected by an optical fiber, and generating configuration information of the connecting optical fiber for the two ports.

Taking the node of ROADM shown in FIG. 4 as an example, port a1 on the emitting side of the ROADM in direction A is connected to port b1 on the receiving side of the ROADM in direction C through an optical fiber; port a2 on the emitting side of the ROADM in direction A is connected to port b1 on the receiving side of the ROADM in direction D through an optical fiber; port an on the emitting side of the ROADM in direction A is connected to port bn on the receiving side of the ROADM in direction D through an optical fiber.

Figure 6:
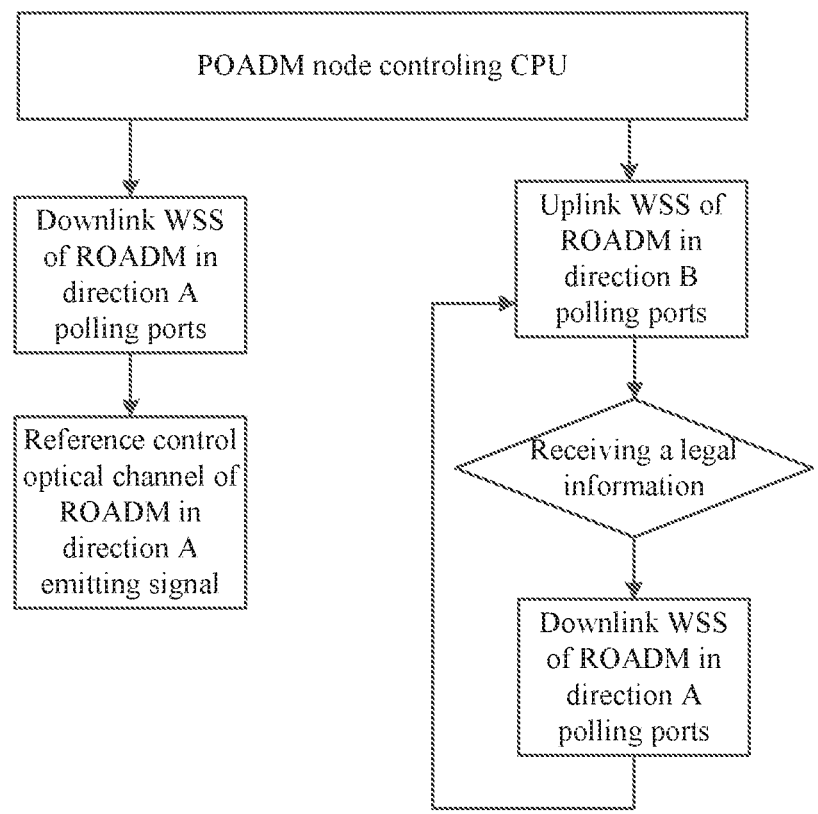
FIG. 6 is a control flowchart for establishing an interconnection relationship between service side ports of different ROADMs through reference control optical channels according to an embodiment of the present disclosure.

According to the optical fiber connection situation in FIG. 4, the process of establishing optical fiber connection relationships among ports of ROADM in each direction by a reference control optical channel is shown in FIG. 6. The reference control optical channel of the ROADM in direction A polls for the respective emitting ports via its downlink WSS, and then transmits the carried information; the uplink WSS of ROADMs in other directions polls at their respective corresponding receiving ports and waits for receiving the information. When the downlink WSS of the ROADM in direction A selects to emit a reference control optical channel signal from its port a1, meanwhile the uplink WSS of the ROADM in direction C selects its port b1 to receive the reference control optical channel signal, the reference control optical signal receiver on the ROADM in direction C may analyze a signal from port a1 of the ROADM in direction A, and then generate configuration information on optical fiber connection between port A1 of the ROADM in direction A and port b1 of the ROADM in direction C. Similarly, configuration information on optical fiber connection between port a2 of the ROADM in direction A and port b1 of the ROADM in direction ID, configuration information between port an of the ROADM in direction A and port bn of the ROADM in direction B, and other possible configuration information not drawn in FIG. 5 may also be correspondingly and automatically generated. Wherein FIG. 6 shows a matching process of performing port polling by the downlink WSS of the ROADM in direction A and port polling by the uplink WSS of the ROADM in direction B at the same time. The matching process between each ROADM in other directions is also performed according to this process, and details are not described herein again.

The method far matching optical fiber connections for ROADM service side provided by the present disclosure, uses a reference control optical channel which works in the wavelength range that may be supported by the WSS but outside the wavelength range of a service optical channel, realizes auto-routing matching at service sides of ROADMs in different directions without interference to service light, and solves a problem of low efficiency of manually configuring optical fiber connection relationships.

Embodiment 3

Based on the above embodiment 1 and embodiment 2, the present disclosure further provides another application of the reference control optical channel which may also be used to monitor performance of physically optical fiber connection after using the device described in embodiment 1 and establishing the matching relationships on optical fiber connection at service sides of the ROADMs by the method described in embodiment 2.

Figure 7:
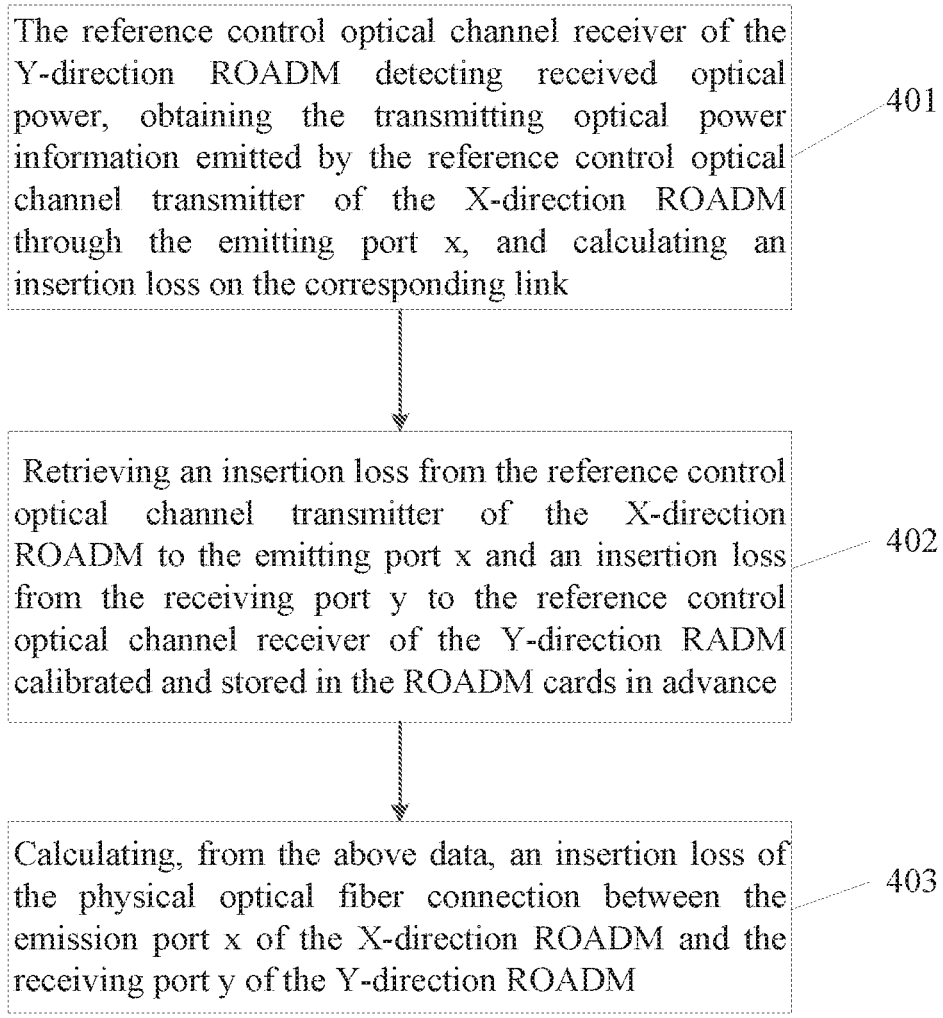
FIG. 7 is a flowchart for detecting performance of optical fiber physical connection by using a reference control optical channel according to an embodiment of the present disclosure.
Figure 8:
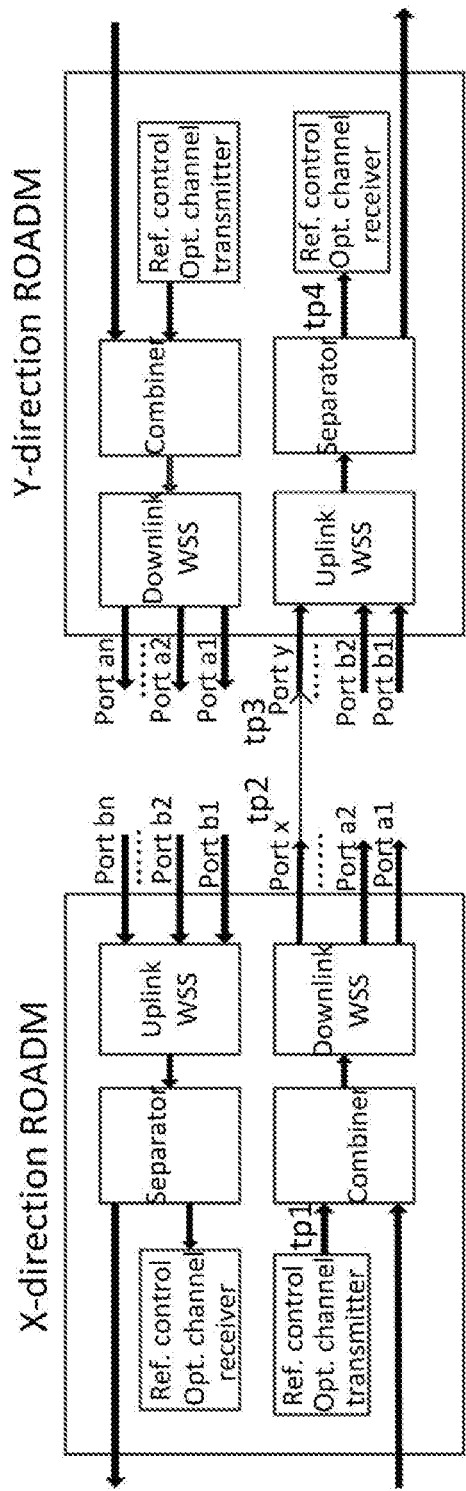
FIG. 8 is an exemplary diagram of detecting optical fiber connection between ports of ROADM in direction X and ports of ROADM in a direction Y by using a reference control optical channel according to an embodiment of the present disclosure.

In the embodiment of the present disclosure, the reference control optical channel signal emitted by the reference control optical channel transmitter 1 through each emitting port further carries transmitting optical power information, then on the basis of establishment of configuration information on the connecting optical fibers for corresponding ports of different ROADMs, the reference control optical channel may also transmit the transmitting optical power information which may be detected and received at a receiving port to obtain insertion loss information of corresponding link and to generate an alarm for optical fiber physical connection with unqualified performance when compared with design value. After emitting port x of the ROADM in direction X establishes a connection relationship with receiving port y of the ROADM in direction Y, the process of detecting performance of physical connection between the two ports is shown in FIG. 7, which specifically includes the following steps:

Step 401: detecting received optical power by the reference control optical channel receiver corresponding to the ROADM in direction Y, meanwhile, analyzing and obtaining the transmitting optical power information emitted from emitting port x by the reference control optical channel transmitter of the ROADM in direction X, and calculating insertion loss information on the corresponding link. Here, combining with FIG. 8, taking a connection between a certain emitting port x of the ROADM in direction X and a certain receiving port y of the ROADM in direction Y as an example, on this link, a reference control optical channel transmitter of the ROADM in direction X (marked as point tp1), port x of the ROADM in direction X (marked as point tp2), port y of the ROADM in direction Y (marked as point 433) and a reference control optical channel receiver of the ROADM in direction Y (marked as point tp4). In practical applications, power p1 at point tp1 and power p4 at point tp4 are obtained by detecting and analyzing, and p1−p4 is the insertion loss value on this optical signal link.

Step 402: retrieving an insertion loss from the reference control optical channel transmitter to the emitting port x of the ROADM in direction X and an insertion loss from the receiving port y to the reference control optical channel receiver of the ROADM in direction Y which are calibrated and stored in the ROADM cards in advance. For each ROADM in different directions, when the ROADMs leaves the factory, an insertion loss from the reference control optical channel transmitter to each emitting port and an insertion loss from each receiving port to the reference control optical channel receiver are calibrated in advance. For example, from the calibration result, it is obtained that an insertion loss from the reference control optical channel transmitter (point tp1) of the ROADM in direction X to the port x (point tp2) is IL1, and an insertion loss from the port y of the ROADM in direction Y (point tp3) to the reference control optical channel receiver (point tp4) is IL2.

Step 403: calculating, from the above data, an insertion loss of the physical optical fiber connection between the emitting port x of the ROADM in direction X and the receiving port y of the ROADM in direction Y The insertion loss of the physical optical fiber connection between the port x (point tp2) of the ROADM in direction X and the port y (point tp3) of the ROADM in direction B is: (p1−p4)−IL1+IL2); if p1−p4>>IL1+IL2, then it means the insertion loss of the physical optical fiber connection between tp2 and tp3 is too large. Here, an alarm threshold may be set according to actual application requirements, and an alarm is generated when (p1−p4)−(IL1+IL2) exceeds the alarm threshold.

In summary, on the basis of establishment of configuration information between corresponding ports of different ROADMs, the device described in embodiment 1 may also be utilized to monitor performance of the physical optical fiber connection between service side ports of ROADMs in different directions by the reference control optical channel, which is another application of the reference control optical channel in the present disclosure.

Embodiment 4

Based on the above embodiment 1 and embodiment 2, the present disclosure further provides another application of the reference control optical channel, wherein the reference control optical channel may also be used as a backup physical channel for cascade communication channels between different chassis, after establishing optical fiber connection relationship at service side of ROADM by the method described in embodiment 2 using the device described in embodiment 1.

After ports are matched in embodiment 2, when a duplex connection relationship is established between ports of ROADMs in two different directions, and the ROADMs in two different directions are located in different chassis, the reference control optical channel is used as a standby physical channel for cascade communication channels between different chassis for carrying cascade interactive services between chassis. The establishing a duplex connection relationship specifically means that a certain emitting port of the ROADM in direction X establishes a connection relationship with a certain receiving port of the ROADM in another direction Y, meanwhile, a certain emitting port of the ROADM in direction Y is also connected with a receiving port x of the ROADM in direction X, then, a duplex connection relationship is established between the ROADM in direction X and the ROADM in direction Y, and then duplex communication may be realized.

Figure 9:
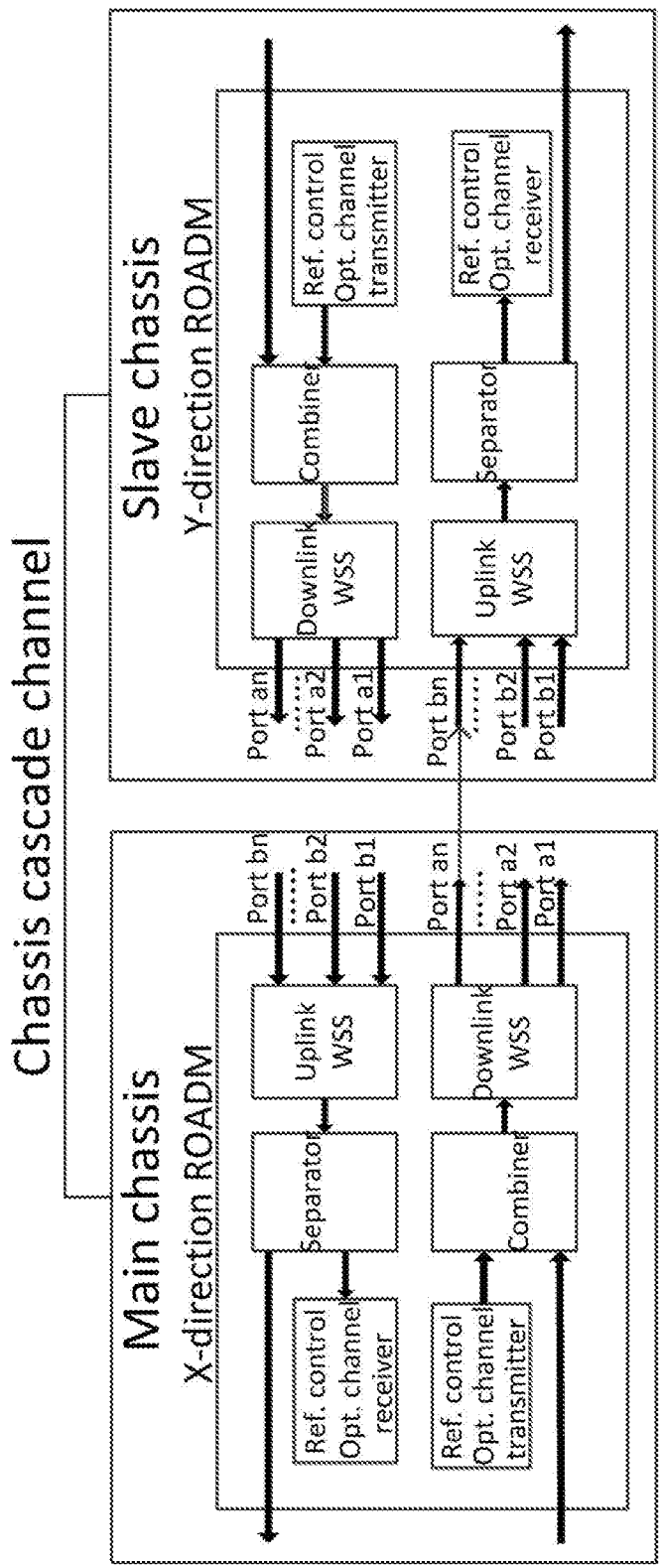
FIG. 9 is an exemplary diagram of using a reference control optical channel as a standby physical channel for cascade communication channels between different chassis according to an embodiment of the present disclosure.

Referring in particular to FIG. 9, assuming that the matching is realized between emitting port an of the ROADM in direction X and receiving port bn of the ROADM in direction Y, and the matching is realized between emission port an of the ROADM in direction Y and receiving port bn of the ROADM in direction X, the ROADM in direction X is located in a main chassis, the ROADM in direction Y is located in a slave chassis, a chassis cascade channel needs to be set between the two devices, i.e. the main chassis and the slave chassis, to establish a communication connection between two chassis, and to complete the information interaction. In general, the chassis cascade channel is a physical connection channel, for example, a communication connection between two chassis is established through a network interface and a network cable. When there is a problem of failure in a network interface or disconnection of a network cable, the communication connection between the main chassis and the slave chassis is disconnected, which affects normal communication. After port an/bn of the ROADM in direction X and port bn/an of the ROADM in direction Y establish a duplex communication connection through a reference control optical channel, the reference control optical channel may directly serve as a standby chassis cascade channel between two chassis, when there is a failure in a network interface or disconnection of network cable, information exchange between the two chassis may still be realized through the standby chassis cascade channel without affecting normal communication, and communication between two chassis may be realized without connecting a network cable.

In summary, on the basis of establishment of configuration information between corresponding ports at service sides of ROADMs in different directions, when the ROADMs in different directions are located in different chassis, the device described in embodiment 1 may also be used and the communication between the reference control optical channels of the ROADMs M different directions may be used to serve as a standby physical channel for cascade communication channels of different chassis, which is another application of the reference control optical channel of the present disclosure.

What is described above is only a preferred embodiment of the present disclosure, and is not intended to limit the present disclosure, and any modifications, equivalent substitutions and improvements made within the spirit and principles of the present disclosure should be included within the scope of protection of the present disclosure.

What is claimed is:

1. A device for matching optical fiber connections for ROADM service, characterized in comprising: a reference control optical channel transmitter (1), a downlink Wavelength Selective Switch (WSS) (2), a plurality of emitting ports, a reference control optical channel receiver (3), an uplink WSS (4) and a plurality of receiving ports;

the reference control optical channel transmitter (1) emitting a first reference control optical channel signal, and the downlink WSS (2) emitting the first reference control optical channel through the respective emitting ports in a polling manner;

the reference control optical channel receiver (3) receiving a second reference control optical channel signal from another matching device, and the uplink WSS (4) selectively receiving the second reference control optical channel over the plurality of receiving ports in the polling manner;

wherein the reference control optical channels operating within an operating wavelength range of WSSs in the ROADM but outside a wavelength range of a service optical channel, wherein the matching device and the another matching device are located in different chassis and duplex-connected with each other, the reference control optical channels further operate as a backup physical channel for a cascade communication channel between the different chassis for carrying cascade interactive services.

2. The device for matching optical fiber connections for ROADM service of claim 1, characterized in further comprising a combiner (5), the combiner (5) being located between the reference control optical channel transmitter (1) and the downlink WSS (2), and the combiner (5) operating to multiplex a downlink service signal of the ROADM with the first reference control optical channel signal and inject them into the downlink WSS (2).

3. The device for matching optical fiber connections for ROADM service of claim 1, characterized in further comprising a wavelength separator (6), the wave separator (6) being located between the uplink WSS (4) and the reference control optical channel receiver (3), and the wave separator (6) operating to separate the second reference control optical channel signal from the uplink service optical signal of the ROADM.

4. A method for matching optical fiber connections for ROADM service side, characterized in that a reference control optical channel is used in the ROADM service, the reference control optical channel operating within an operating wavelength range of WSS in the ROADM but outside a wavelength range of a service optical channel; an uplink WSS, a downlink WSS, a plurality of emitting ports and a plurality of receiving ports being provided in the ROADM, and the method comprises:

on an emitting side of the reference control optical channel in a first ROADM, emitting, by the downlink WSS, a reference control optical channel signal through the respective emitting ports in a polling manner; on a receiving side of the reference control optical channel in a second ROADM, receiving, by the uplink WSS, the reference control optical channel over the respective receiving ports in the polling manner, when any receiving port of the second ROADM receives the reference control optical channel signal from a certain emitting port of the first ROADM, establishing a matching relationship between the receiving port of the second ROADM and the certain emitting port of the first ROADM connected by an optical fiber, wherein the first ROADM and the second ROADM are located in different chassis and duplex-connected with each other, the reference control optical channel further operates as a backup physical channel for a cascade communication channel between the different chassis for carrying cascade interactive services.

5. The method for matching optical fiber connections for ROADM service side of claim 4, characterized in that on the emitting side of the reference control optical channel in the first ROADM, the reference control optical channel signal emitted through the respective emitting ports carries ROADM card information and corresponding emitting port information.

6. The method for matching optical fiber connections for ROADM service side of claim 5, characterized in that on the emitting side of the reference control optical channel in the first ROADM, emitting, by the downlink WSS, a reference control optical channel signal through the respective emitting ports in a polling manner, further comprises: determining a current emitting port by polling by the downlink WSS, emitting the reference control optical channel signal which carries the ROADM card information and the current emitting port information from the determined current emitting port by a reference control optical channel transmitter, thereby transmitting the carried information;

wherein when a downlink service optical signal and the reference control optical channel signal exist simultaneously, the downlink service signal is injected into the downlink WSS together with the reference control optical channel signal, and is emitted out from the corresponding emitting port.

7. The method for matching optical fiber connections for ROADM service side of claim 5, characterized in that when any receiving port of the second ROADM receives the reference control optical channel signal from a certain emitting port of the first ROADM, establishing a matching relationship between the receiving port of the second ROADM and the certain emitting port of the first ROADM connected by an optical fiber, further comprises:

determining a current receiving port in the second ROADM through polling the respective receiving ports by the uplink WSS;

when a reference control optical channel receiver receives, through the current receiving port of the second ROADM, the reference control optical channel signal emitted from an emitting port of the first ROADM in any other direction, analyzing the carried information of the received reference control optical channel signal; and through analyzing the carried information, determining the first ROADM and corresponding emitting port that emits the reference control optical channel signal, establishing a matching relationship between the current receiving port of the second ROADM and the corresponding emitting port of the first ROADM connected by an optical fiber, and generating configuration information of the connecting optical fiber for the two ports.

8. The method for matching optical fiber connections for ROADM service side of claim 7, characterized in that the reference control optical channel receiver receiving, through the current receiving port of the second ROADM, the reference control optical channel signal emitted from an emitting port of the first ROADM in any other direction further comprises:

a combined optical signal of an uplink service signal of the second ROADM and the reference control optical channel signal entering into the uplink WSS through the current receiving port, and after being separated, injecting the reference control optical channel signal into the reference control optical channel receiver of the second ROADM.

9. The method for matching optical fiber connections for ROADM service side of claim 4, characterized in that the reference control optical channel signal emitted by the reference control optical channel transmitter through the respective emitting port of the first ROADM carries transmitting optical power information, and the method further comprises, after the connection relationship is established between an emitting port x of the first ROADM in a direction X and a receiving port y of the second ROADM in a direction Y:

the reference control optical channel receiver of the second Y-direction ROADM detecting received optical power, analyzing and obtaining the transmitting optical power information emitted by the reference control optical channel transmitter of the first X-direction ROADM through the emitting port x, and calculating an insertion loss on the corresponding link;

retrieving an insertion loss from the reference control optical channel transmitter of the first X-direction ROADM to the emitting port x and an insertion loss from the receiving port y to the reference control optical channel receiver of the second Y-direction ROADM calibrated and stored in the ROADM cards in advance;

calculating, from the above data, an insertion loss of the physical optical fiber connection between the emission port x of the first X-direction ROADM and the receiving port y of the second Y-direction ROADM.

* * * * *